Patented June 26, 1945

2,379,248

UNITED STATES PATENT OFFICE 2,379,248

METHOD OF PREPARING CURVED SHEETS OF POLYMERIC MATERIAL

Irving E. Muskat, Akron, Ohio, assignor to Pittsburgh Plate Glass Company, Pittsburgh, Pa., a corporation of Pennsylvania No Drawing. Application May 29, 1942,
Serial No. 445,072

10 Claims. (Cl. 18—55)

This invention relates to the polymerization of polymerizable organic compounds which contain at least two polymerizable unsaturated groups which are preferably unconjugated with respect to carbon, and is particularly related to the polymerization of oxygen compounds, especially esters, ester amides, and ethers containing at least two polymerizable unsaturated groups which preferably are unconjugated with respect to carbon. In the cast polymerization of such materials by ordinary methods, it has been found that the production of sheets having a curved contour is exceedingly difficult since the resulting polymerization products are often badly cracked and further, since the polymers often fracture upon removal from curved molds.

In accordance with the present invention, these difficulties have been avoided and clear transparent polymers of any desired shape which are free from cracks and bubbles and surface defects have been produced in a simple manner. The polymerization of the materials herein contemplated appears to proceed through a plurality of stages. The polymerization is first initiated, the monomer thickens to a viscous syrup which is probably a solution of a fusible polymer dissolved or dispersed in the monomer. This fusible polymer is generally soluble in many organic solvents. As polymerization proceeds further, a solid or semi-solid gel is formed. The character of this gel is dependent largely upon the degree to which it has been polymerized. At least a portion of this gel is found to be substantially insoluble in the common organic solvents such as xylene or acetone, and merely swells or remains unaffected when pulverized and extracted with such solvent. Generally, the polymer in the gel comprises a mixture of soluble and insoluble constituents and the two may be separated by extraction with solvents. In most cases the quantity of insoluble material in the gel is large, often being about 20 to 90 percent by weight of the total mixture.

Ordinarily, the gels of low acetone insoluble content (20 to 75 percent) do not possess substantial rigidity and generally a flat sheet thereof may be bent or curved to a substantial degree without fracture. For example, ethylene glycol bis (methallyl carbonate) may be polymerized to form a polymer ⅛ of an inch in thickness, 12 inches long and 2 inches wide and containing about 50 percent of insoluble matter which may be lapped upon itself to form a cylindrical section. Gels of high content of acetone insoluble polymer, however, often possess considerable stiffness, and often are not sufficiently flexible to permit their being bent to a severe curvature unless heated. This may be particularly true of thick sections thereof. Many of these gels are comparatively weak, do not possess high tensile strength, and tear or crumble readily.

The polymerization products may be further polymerized and as polymerization proceeds, the concentration of insoluble matter therein as well as the strength and rigidity of the polymer increases usually until a hard, tough polymer which is considerably less brittle than glass and more resistant to shattering is formed. Such polymers have high tensile strength and elasticity and have many of the properties characteristic of other organic glasses. Generally, these products possess substantial rigidity and form stability. When a deforming load impressed upon such polymers at an elevated temperature is released, the polymers reassume their original shape immediately or at least very quickly.

In accordance with the present invention, it has been found that clear, transparent, and strong polymers of various shapes may be prepared by polymerizing the compounds herein contemplated to a gel containing substantial portions of soluble and insoluble components, molding or shaping the cast gel, and further polymerizing the shaped gel. This further polymerization serves to set the polymer and to retain it in the form imparted thereto, whereby a permanently shaped product is secured. Thus, sheets of gel containing a substantial quantity, for example, 20 to 90 percent insoluble polymer may be bent or curved to produce a shaped unfractured sheet which upon further polymerization will retain the shaped form.

The polymerization may be conducted by various methods. For example, the polymerization of the compounds herein contemplated may be conducted under conditions such that strains exceeding the rupture point of the polymer are prevented from being established and a major portion or all of the tension established within the polymer during polymerization is released before the polymer fractures and generally while the polymer is a flexible gel having an insoluble content of 20 to 90 percent. When polymerization is conducted in a mold, the surface portion of the polymer is released from adherence to the mold surface, whereby this portion is permitted to shrink, thereby preventing the establishment of surface strains which might otherwise rupture the polymer. This method is described and claimed in application Serial No. 398,316 filed June 16, 1941, by Albert G. Chenicek.

When the monomer or syrupy polymer is polymerized in a mold by ordinary cast polymerization processes, internal strains are established within the gel as polymerization proceeds through the gel state and ultimately these strains become so great that the tension within the polymer exceeds its rupture point and fractures are formed. While the gel has previously been regarded as incapable of contraction, it has been discovered as described in said application, that if the gel is freed from the mold surface or if the gel is prevented from adhering tenaciously to such surface the gel is capable of shrinking to an extent such that a major portion of the internal tension is released, and unfractured polymers are secured. Generally, this shrinkage is effected by freeing the surface or surfaces of the polymerized gel from the mold to permit the polymer to shrink and thereafter, polymerization is continued. If necessary, this process may be repeated, or, if desired, the further polymerization may be conducted in a manner such that gradual shrinkage may occur during the polymerization. Alternatively, the polymer, particularly the surface portion adjacent the mold, may be permitted to shrink gradually during the polymerization by methods hereinafter more fully described. These polymers may be shaped as herein contemplated and further polymerized.

In accordance with a further method, a mold may be prepared comprising a pair of smooth sheets of window glass, tempered glass, polished metal, etc., opposed to each other and separated by a gasket of an elastic material such as rubber, polymerized polyvinyl chloride, Thiokol, chloroprene, etc., arranged around the edges of the plates to provide a narrow rectangular cell. This mold may be filled with monomer, or partially polymerized monomer containing a catalyst and the product heated, for example, at 70° C. During polymerization a light pressure, for example, 2 to 10 pounds per square inch, is maintained upon the plates sufficient to prevent the polymer from shrinking along the glass or other mold surface and to force the shrinkage to occur substantially wholly in a single dimension. After polymerization has proceeded to a suitable degree, for example, to an acetone insolubility of 70 to 90 percent, the polymer may be removed from the mold, shaped as herein contemplated and further polymerized.

The invention is particularly related to the treatment of polyesters of polybasic acids or polyacids which esters contain at least two unsaturated groups which are unconjugated with each other through carbon. The term "polyacid" as herein used is intended to include any compound containing two esterifiable acid groups. Thus, the term includes the usual polybasic acids listed below as well as more complex acids, wherein a pair of acid groups are separated by one or more acid linkages. Thus, the invention may be applied to the unsaturated alcohol polyesters of polybasic acids such as the esters of oxalic, maleic, malonic, adipic, succinic, itaconic, citric, tartaric, fumaric, phthalic, sulphuric, carbonic, silicic, phosphoric, or titanic, acids or other acids such as diglycolic, or dilactic acid, etc., and which unsaturated monohydric alcohols preferably contain 2 to 5 carbon atoms such as allyl, vinyl, methallyl, β-ethyl allyl, crotyl, isocrotyl, 2-chloroallyl, methyl vinyl carbinyl, isopropenyl, isobutenyl, butadienyl, propargyl, or tiglyl alcohol or other unsaturated alcohols containing up to 10 carbon atoms including the corresponding esters of cinnamyl, linallyl, ethyl vinyl carbinyl, or other alcohol. Mixed esters such as vinyl-allyl, vinyl-crotyl, vinyl-methallyl, and methallyl-allyl esters may also be subjected to treatment. Likewise, the invention may be applied to treatment of the esters formed by reaction of a polyhydric compound such as ethylene glycol, propylene glycol, or butylene glycol, or the corresponding polyglycols, trimethylene glycol, hexamethylene glycol, glycerol, methyl glycerol, resorcinol, hydroquinone, phthalyl alcohol, polyvinyl alcohol, hydrated cellulose, soda cellulose, etc., with unsaturated haloformates such as allyl or methallyl chloroformates or acid esters of polybasic acids and unsaturated alcohols such as allyl, methallyl, or crotyl acid oxalate, acid phthalate, acid maleate, acid succinate and acid adipate. These compounds are described and claimed in copending application for Letters Patent of Franklin Strain and Irving E. Muskat, Serial No. 361,280, filed October 15, 1940.

The invention is also applicable to polyesters formed by reacting esters of hydroxy acids and unsaturated alcohols, such as vinyl, allyl, or methallyl lactate, glycolate or salicylate, with polybasic acids or with esters of polybasic acids and unsaturated alcohols, such as allyl, methallyl, crotyl, or other chloroformate, allyl methallyl or other acid phthalate, acid maleate or acid succinate. These compounds are described and claimed in applications of Franklin Strain and Irving E. Muskat, Serial No. 365,103, filed November 9, 1940, and Serial No. 392,103, filed May 6, 1941.

The invention is also applicable to the treatment of unsaturated alcohol esters of unsaturated acids such as crotonic, propiolic, and cinnamic acid esters of the above unsaturated alcohols. It may also be applied to polymerization of more actively polymerizable esters such as acrylic or alpha methyl, alpha ethyl, alpha chloro or other alpha, halo, or alpha alkyl substituted acrylic acids and unsaturated alcohols, although in such a case great care may be required in view of the rapidity with which these materials polymerize to the infusible state. In addition, other compounds containing at least two unsaturated groups, preferably those which are unconjugated with respect to each other through carbon, such a glycol or glycerol polycrotonate, polyacrylate, polymethacrylate or polychloroacrylate, glycerol, di-, or triallyl ether, glycol dimethallyl ether, ether-esters such as the ester of allyl or methallyl cellosolve and polybasic acids such as carbonic, sulphuric, phthalic, or oxalic acids, etc. Moreover, the ester amides corresponding to the above-mentioned esters such as the allyl or methallyl esters of phthalamide or adipamide may be treated as herein described as well as substituted ureas such as diallyl urea, dicrotyl urea, and N N' ethylene diacrylamide. Likewise, unsaturated esters of amino acids such as unsaturated carbamates, sulphamates, or esters of glycine or partial amides of polybasic acids may be treated with aldehydes such as formaldehyde to form bis alkylidine esters and these compounds treated in accordance with the present invention.

In order to obtain products of suitable strength and utility it is desirable to utilize compounds wherein the number of carbon atoms in the monomeric molecule is not excessive. Thus, allyl esters polymerize to form substantially harder products than the polymer produced by direct polymerization of oleyl esters. Other things being equal, the trend toward softer products increases as the number of carbon atoms per unsaturated group increases. The trend toward softer products with increase in carbon atoms may be minimized by increasing the number of polymerizable groups in the composition. In general, it is preferred to make use of agents wherein the ratio of the number of carbon atoms to the number of polymerizable unsaturated groups does not exceed 15, and preferably, should be below 10.

Generally, the polymerization is conducted by means of heat and/or light such as ultra-violet light and in the presence of an oxygen catalyst such as oxygen, ozone, peroxides such as lauryl peroxide, acetone peroxide, benzoyl peroxide, or tetralin peroxide, etc., or alkyl percarbonates such as ethyl percarbonate. If desired, thick blocks may be cast in the manner herein described and the block of gel thus obtained may be sliced into thin sheets, shaped, and further cured.

The conditions required for polymerization to form the gel may vary considerably in accordance with the activity of the compound being polymerized, catalyst concentration, and temperature. Generally, the temperature of polymerization should be maintained sufficiently low to insure the presence of enough catalyst in the gel to be shaped to permit its further polymerization to an insoluble content of at least 90 to 95 percent. This is particularly desirable in dealing with allyl, methallyl, and similar esters of polybasic acids including the complex mixed esters such as ethylene glycol bis (allyl carbonate) Up to 5 percent of catalyst may be required for such purpose.

The time at which the gel may be removed from the mold and subjected to shaping operations is determined by the nature of the gel and varies widely with different polymerizable materials, different catalyst concentration, presence of inhibitor, etc. Accordingly, no hard and fast rule may be laid down. If it is attempted to remove the gel from the mold before it has developed sufficient strength, it may tear during the releasing operation. On the other hand, if the polymer is polymerized to an excessive degree, the product acquires substantial rigidity and is less easy to mold. Moreover, the molded polymer may be less easily polymerizable. In general, the time when the gel should be released may be ascertained by preliminary tests. Roughly, the time may be determined by measuring the percent of insoluble matter present in the gel. This may be done by disintegrating a weighed portion of the gel, extracting the gel overnight with a solvent for monomer and soluble polymer, such as acetone, chloroform, carbon tetrachloride, xylene, etc., and determining the weight of undissolved matter. For most purposes, the percent insoluble in the gel should exceed 20 percent by weight of the gel, but generally, should not be in excess of about 90 percent by weight. Preferably, gels containing 50 to 90 percent by weight of insoluble matter therein are treated in accordance with this invention.

The partial polymers thus obtained may be subjected to various bending or shaping operations. In view of the high flexibility of cast sheets of this polymer they may be caused to take the contour of numerous curved molds without recourse to high pressure. In dealing with the products of comparatively high insoluble content, for example, 70 to 90 percent, however, some pressure may be used to force the polymer to the desired shape of the mold. In any case, the pressure if used should be sufficiently low to ensure production of an unfractured product during shaping.

Where the pressure is excessive, the gel being brittle will tear, fracture, or even crumble. Accordingly, these products should be shaped or formed without exceeding the yield point of the material and preferably without exceeding the elastic limit.

The shaped polymers thus obtained are then further polymerized while holding them in their shaped condition in order to prevent the polymers from springing back to their original shape. By further polymerizing the polymer in its shaped or curved state the bonds established by the polymerization serve to retain the contour imparted thereto or at least a substantial portion thereof. To ensure the production of a form stable product at least 10 percent or more of the polymerization should preferably occur after the shaping process. Often the polymerization is conducted in the absence of air which may inhibit the polymerization. This may be done, for example, by polymerizing between a pair of molds having the desired shape.

It is also possible to produce shaped products by heating a substantially completely polymerized unsaturated alcohol polyester of a polybasic acid, forming the heated polymer while in the heated condition, and cooling the heated and formed sheet. This method is described and claimed in Serial No. 444,925 filed by me on May 28, 1942. A variation of this method may be used to practice the present invention by heating and forming a partial polymer and thereafter polymerizing and cooling the shaped product. In such a case, somewhat less polymerization may be required to produce a form stable product.

The process is particularly adapted to the treatment of sheets, strips, or rods of the polymer having a thickness or diameter comparatively small with respect to the length and/or width thereof. Thus, flat sheets may be cast polymerized and bent to take a curved contour and polymerized in the curved form. Moreover, tubes or rods of circular, elliptical, triangular, rectangular, or other cross section may be polymerized as herein contemplated and coiled, curved, or otherwise shaped. These shaped tubes or rods may then be further polymerized. Thus, sheets of solid partial polymer may be wrapped around a mandrel, and cured to produce a polymer which is cylindrical in shape. Likewise, the polymer may be placed between a pair of spherically curved molds to form a spherical segment. In like manner, the polymer may be given various other shapes. The thus molded or shaped polymer is further polymerized, generally while the mold is maintained in contact as previously described in order to secure smooth surfaces.

During the time at which the gel is undergoing shaping or forming treatment, it is often desirable to interrupt polymerization. With many of these materials this may be done by cooling the gel to room temperature. On the other hand, more active materials may require chilling to low temperatures. In dealing with very active substances such as allyl or methallyl methacrylate, or glycol dimethacrylate, the production of the gel requires special precautions and, generally, it is desirable to polymerize such materials in the presence of an inhibitor such as hydroquinone or a diluent such as a slowly polymerizable material, for example, allyl crotonate, crotyl crotonate, dicrotyl phthalate, etc., in order to decrease the rate of polymerization to an extent such that a gel may be obtained.

The temperature required for polymerization of the compounds herein contemplated in order to produce the gel and also to further cure the gel is dependent upon the nature of the compound being polymerized and especially upon the catalyst used. In general, it may be stated that the temperature should not exceed the temperature at which the peroxide catalyst decomposes spontaneously and should be maintained sufficiently below this temperature to insure the presence of a catalyst in the gel until polymerization has proceeded to a desired degree. Using benzoyl peroxide as a catalyst, polymerization to the gel state at a temperature of 50 to 90° C. is found to be preferable. The gel is, in general, further cured at 70 to 90° C. and finally cured at a somewhat higher temperature, for example, 100 to 125° C. Finally, the residual catalyst may be completely destroyed by raising the temperature to a sufficiently high level, for example, 150° C. With catalysts such as acetone peroxide, the permissible temperature limitations, particularly in the final stages of cure, may be considerably higher. On the other hand, certain catalysts decompose too rapidly at the specified temperatures and accordingly, lower temperatures are required.

The following examples are illustrative:

Example I

Diallyl phthalate containing 5 percent by weight of benzoyl peroxide was heated at a temperature of 70 to 80° C. until the liquid thickened and the viscosity had increased approximately by 500 percent. 500 grams of this thickened monomer was poured into a glass tray 14 inches long. The tray was heated in an oven at 75° C. for 3 hours. The tray was then taken from the oven and the sides removed. The gel resting on the bottom plate was allowed to cool to 50–60° C. A strip 0.5 inch wide, was cut from the sides, employing a razor blade with a straight edge, and the gel was then lifted from the plate and allowed to cool to room temperature. Upon removal from the plate it shrank approximately ¼ inch in length and width. The gel was very flexible and slightly elastic. It possessed a slight blue fluorescence. The surface exposed to the atmosphere during the heating period was tacky.

A portion of the gel trimmed from the sides contained 3.2% of benzoyl peroxide and 44% of acetone-insoluble material. One-hundred grams of thickened monomer was poured upon a glass mold having a spherical curvature of about 18 inches radius of curvature. The gel was trimmed to a circular section and placed, tacky side upward, on the pool of monomer and rolled onto the mold in such a way as to force the pool of monomer across the plate to the opposite side, whereby air was squeezed from between the plates and the polymer and the glass and polymer surfaces were completely coated and the gel had taken the contour of the mold.

A second pool of thickened monomer, 100 grams, was poured upon the exposed surface of the gel. A second tempered glass mold of similar curvature was lowered upon the pool of monomer, whereby the monomer was forced to flow to the opposite side to coat the plate and the gel surface and to avoid air entrapment. Excess monomer was drained from the plates and swabbed from the sides of the gel.

The resulting sandwich was heated in an oven at 75° C. for two hours. Thereafter, the temperature of the oven was raised to 100° C. and heating continued for one-half hour. The plates were then pried apart and the sheet removed from the oven. The sample was pulled from the bottom plate to which it adhered tenaciously, and allowed to cool. At this stage, the sample was colored slightly yellow when viewed edgewise and possessed a blue fluorescence. The polymer thus secured was placed between a pair of curved tempered glass plates and heated for two hours at a temperature of 100° C. and then allowed to cool between the plates. A sheet of transparent polymer $\frac{1}{16}$ inch in thickness and having the shape of a watch glass was thus obtained.

Example II

A quantity of partially polymerized ethylene glycol bis (methallyl carbonate) was prepared by heating monomeric ester containing 5 percent by weight of benzoyl peroxide until the viscosity increased 500 percent. The thickened monomer was then poured into a tray 14 inches square as in Example I, and heated at 80° C. for 90 minutes.

The gel was colorless, flexible, and tacky on the surface exposed during the heating period. By analysis of samples thereof, peroxide content was found to be 2.8 percent by weight and the acetone-insoluble content was 52 percent by weight.

The gel was removed from the tray to permit shrinkage and was coated with further thickened monomer ethylene glycol bis (methallyl carbonate) and placed between the glass molds described in Example I, using thickened monomer on both sides of the gel as described in Example I. The resulting sandwich was placed in an oven and heated at 80° C. for one hour and thereafter, the product was heated at 100° C. for one hour. At this time the plates were removed from the sheet as in Example I and the product was heated at 100° C. for two hours. A clear, hard, and apparently haze-free sheet $\frac{1}{16}$ inch in thickness and having the shape of a watch glass was obtained.

Example III

The process of Example I was repeated using diethylene glycol bis (methallyl carbonate) to produce a flexible colorless gel which was tacky on one side. The gel was provided with coatings on both sides and placed between glass molds as described in Example I. The sandwich was heated for 75 minutes at 80° C. and then at 100° C. for two hours. The sheet was then removed from the plates and heated at 100° C. for two hours.

Example IV

A quantity of partially polymerized ethylene glycol bis (allyl carbonate) was prepared by heating monomeric ester containing 5 percent by weight of benzoyl peroxide, at a temperature of 70° C., until the viscosity had increased 200 percent. The thickened monomer was then poured into a 14″ x 14″ tray as in Example I and heated for 250 minutes at a temperature of 70° C. The gel was removed from the tray and provided with coatings of a further portion of partially polymerized ethylene glycol bis (allyl carbonate) on both sides and placed between curved glass molds as described in Example I. The thickened monomer used for coating had been polymerized to a viscosity increase of 500 percent at a temperature of 70° C. The sandwich was heated for one hour at 75° C. and then at 100° C. for 15 minutes. The sheet was then removed from the plates and heated at 100° C. for 30 minutes.

Example V

A sheet of gel of ethylene glycol bis (methallyl carbonate) prepared as in Example II, 12" x 12" x 3/16" was wrapped about a cylindrical mandrel and cured as in Example II, whereby a cylindrical tube was secured.

Example VI

A sheet of gel of ethylene glycol bis (methallyl carbonate) was prepared as in Example II. This sheet was placed between glass plates coated with a thin film of lead oleate and heated at a temperature of 80° C. for three hours. Thereafter, the glass plates were removed and the product was further heated for an hour at 100° C. and a smooth surfaced polymer was secured.

Example VII

A mold was prepared by clamping a pair of tempered glass sheets 18 inches square together face-to-face, by means of C clamps located along the edges of the mold, using a flexible gasket of "Koroseal," a plasticized polyvinyl chloride, approximately one-eighth inch in thickness and one-half inch in width as a separator located between the sheets and adjacent the edges thereof. The mold thus formed was mounted vertically upon one corner thereof.

The mold was filled with diethylene glycol bis (allyl carbonate) containing 2 percent by weight of benzoyl peroxide and allowed to stand until air bubbles had escaped. Thereafter, the mold was heated at 70° C. for 28 hours, a pressure of about 2 pounds per square inch being applied to the plates to compel the shrinkage to occur substantially wholly in a single dimension. The polymer was removed and found to have a Knoop hardness of 2.3. This polymer containing about 15 percent of acetone soluble and 85 percent of acetone insoluble material. A section of the polymer, 6 inches by 6 inches by one-eighth inch, was wrapped upon a mandrel having a six-inch radius of curvature and held in place by a sheet of metal placed upon the exterior thereof. The polymer was then heated according to the following schedule:

| Time, minutes | Temperature, °C. |
|---|---|
| 45 | 72 |
| 30 | 80 |
| 20 | 85 |
| 40 | 91 |
| 15 | 93 |
| 15 | 95 |
| 15 | 97 |
| 15 | 100 |
| 8 | 104 |
| 7 | 107 |
| 8 | 111 |
| 82 | 115 |

Example VIII

A mold constructed as described in Example VII was filled with ethylene glycol bis (allyl carbonate) containing 2 percent by weight of benzoyl peroxide and the mold heated at 70° C. for 24 hours. During the polymerization a pressure of 2 to 3 pounds per square inch was maintained upon the plates by periodic tightening of the clamps. Thereafter, the polymer was removed and found to be about 85 percent insoluble in acetone, and to have a Knoop hardness of about 1.4.

The polymer was placed between a pair of curved molds having a variable radius of curvature ranging between 2.5 and 8 inches and heated at 70° C. for 46 hours. A smooth curved polymer was secured.

Example IX

The process of Example VIII was repeated using diallyl carbonate containing 5 percent benzoyl peroxide in lieu of the ethylene glycol bis (allyl carbonate) and heating at 70° C. for 15 hours before the polymer was removed. Thereafter, the polymer was shaped and cured as in Example VIII.

Example X

The process of Example VIII was repeated using diallyl phthalate containing 3 percent benzoyl peroxide in lieu of diethylene glycol bis (allyl carbonate).

Although the present invention has been described with particular reference to the specific details of certain embodiments thereof, it is not intended that such details shall be regarded as limitations upon the scope of the invention, except insofar as included in the accompanying claims. This application is a continuation-in-part of my copending application Serial No. 398,241, filed June 16, 1941.

I claim:

1. The method of preparing curved sheets of a polymer of an ester containing two unsaturated molecular groups in which the unsaturation is in a straight carbon chain and is attached to the second carbon from an ester linkage which method comprises heating said ester in liquid monomeric form in the presence of an organic peroxy polymerization catalyst until a gel sheet containing at least 20 percent of an acetone insoluble polymer and at least 10 percent of an acetone soluble polymer is formed, the temperature of polymerization being sufficiently low to avoid decomposition of all of the organic peroxy catalyst, curving the cast sheet in a suitable mold and heating the gel sheet in said mold at a temperature sufficient to decompose the remaining catalyst and thereby effect a further polymerization to form a hard rigid curved sheet.

2. The method of preparing curved sheets of a polymer of an ester containing two unsaturated molecular groupings in which the unsaturation is in a straight carbon chain and is attached to the second carbon atom from an ester linkage, which method comprises heating a liquid monomer of said ester in the presence of up to five percent of an organic peroxy polymerization catalyst until a soft solid gel sheet containing unreacted catalyst is formed, the reaction being conducted in a mold comprised of parallel sheets of plate glass and an edge retaining gasket of a soft elastic material, freeing the soft gel sheet from the mold, curving the soft gel sheet and while maintaining the curvature heating to induce further polymerization to form a hard rigid curved sheet of polymer.

3. The method of preparing curved sheets of a polymer of an ester containing two polymerizable groups derived by the esterification of a monohydric alcohol having an unsaturated linkage in a straight carbon chain and having said unsaturation attached to the second carbon atom from the hydroxy group, which method comprises subjecting a liquid monomer of said ester containing an organic peroxy compound to conditions of polymerization between parallel plates of glass to form a gel sheet which is solid at the temperature of polymerization, the polymerization conditions being such that part of the organic peroxy compound remains unreacted, freeing said gel sheet from the glass plates, curving said gel sheet and subjecting the gel sheet to conditions of polymerization while maintaining it in the curved position.

4. The method of preparing curved sheets of a polymer of an ester containing two polymerizable groups derived by the esterfication of a monohydric alcohol having an unsaturated linkage in a straight carbon chain and having said unsaturation attached to the second carbon atom from the hydroxy group, which method comprises heating a liquid monomer of said ester in a suitable mold and in the presence of an organic peroxy polymerization catalyst until a soft solid gel sheet is formed, the temperature of said polymerization being sufficiently low to avoid complete decomposition of the organic peroxy polymerization catalyst, bending the gel sheet and heating it to induce further polymerization while maintaining the gel sheet in the bent condition to form a hard rigid curved sheet.

5. The method of claim 1 in which the ester is a diallyl ester.

6. The method of claim 1 in which the ester is a dimethallyl ester.

7. The method of claim 1 in which the ester is diallyl phthalate.

8. The method of claim 3 in which the ester is a diallyl ester.

9. The method of claim 3 in which the ester is a dimethallyl ester.

10. The method of claim 3 in which the ester is diallyl phthalate.

IRVING E. MUSKAT.